(12) United States Patent
Sheng et al.

(10) Patent No.: US 8,934,055 B1
(45) Date of Patent: Jan. 13, 2015

(54) CLUSTERING BASED MOTION LAYER DETECTION

(71) Applicant: Pixelworks, Inc., Portland, OR (US)

(72) Inventors: Xiaojie Sheng, Shanghai (CN); Neil Woodall, Newport Beach, CA (US); Yue Ma, Pleasanton, CA (US); Bob Zhang, Santa Clara, CA (US); Guohua Cheng, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 0 days.

(21) Appl. No.: 13/917,899

(22) Filed: Jun. 14, 2013

(51) Int. Cl.
  H04N 7/01 (2006.01)
  H04N 11/20 (2006.01)
  H04N 7/12 (2006.01)
  H04N 11/02 (2006.01)
  H04N 11/04 (2006.01)
  G06K 9/36 (2006.01)

(52) U.S. Cl.
  CPC .................................. *H04N 7/0137* (2013.01)

USPC ................. 348/452; 375/240.16; 375/240.26; 382/285

(58) Field of Classification Search
  None
  See application file for complete search history.

(56) References Cited

U.S. PATENT DOCUMENTS

| | | | |
|---|---|---|---|
| 5,784,115 A * | 7/1998 | Bozdagi | 348/452 |
| RE42,790 E * | 10/2011 | Schonfeld et al. | 375/240.16 |
| 2006/0039477 A1* | 2/2006 | Christiansen | 375/240.16 |
| 2006/0193387 A1* | 8/2006 | Wu et al. | 375/240.16 |
| 2008/0205791 A1* | 8/2008 | Ideses et al. | 382/285 |
| 2012/0288015 A1* | 11/2012 | Zhang et al. | 375/240.26 |

* cited by examiner

*Primary Examiner* — Jefferey Harold
*Assistant Examiner* — Sean Haiem
(74) *Attorney, Agent, or Firm* — Marger Johnson & McCollom PC

(57) ABSTRACT

A method of performing motion compensation includes dividing a current frame of video data into blocks, and clustering the blocks based on motion vectors.

14 Claims, 5 Drawing Sheets

CLUSTERING BASED MOTION LAYER DETECTION

BACKGROUND

Frame interpolation creates an image frame from neighboring images. The neighboring images may be fields in an interlaced video format, used to form a frame of data, or neighboring frames of a soon-to-be-created frame. Higher frame rates are generally desirable.

In the simplest approach, one could increase the frame rate by repeating the most recent frame until the next frame is ready for display. However, this does not account for moving objects which may appear to jump from frame to frame and have flickering artifacts instead of the appearance of smooth motion.

Motion estimation and motion compensation techniques may alleviate many of these issues. These techniques rely upon motion vectors to shift the image data for the moving object to the correct position in interpolated frames, thereby compensating for the motion of the object and allowing for better accuracy in interpolated frames.

In addition, motion compensation is used in converting from two-dimensional (2D) to three-dimensional (3D) images. This is generally accomplished using a depth map in conjunction with the motion estimation. More accurate motion estimation allows for a more accurate conversion and a better resulting image.

Issues arise with computational complexity and the use of resources in motion compensation and motion estimation. Techniques that accomplish motion compensation with high accuracy for relatively low computational costs and overall lower hardware costs would be beneficial.

DETAILED DESCRIPTION OF THE EMBODIMENTS

Figure 1:
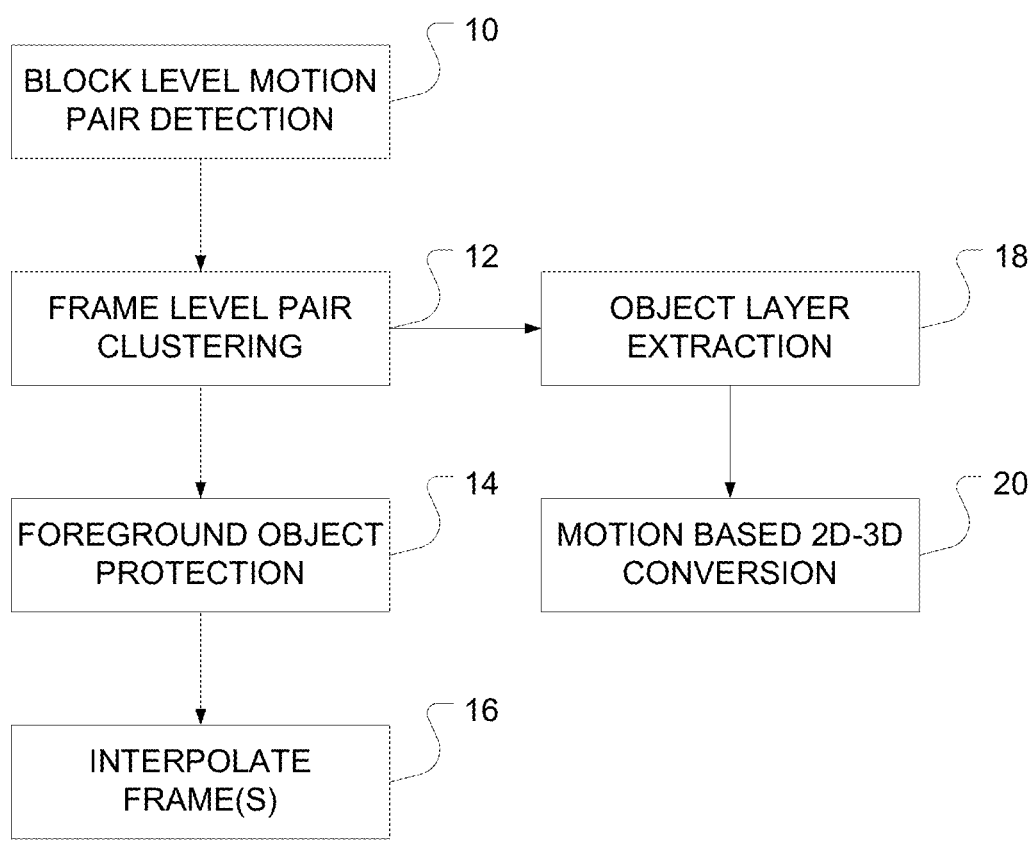
FIG. 1 shows a block diagram of an embodiment of motion estimation and compensation using motion layers.

FIG. 1 shows an overview of an embodiment of a motion estimation and compensation using motion layers. A current frame of video data is divided into blocks and each block is analyzed to determine the foreground and background motion vectors for that block at 10. This determination may be performed in many different ways, with one of the results being that objects that are moving in a video image are typically designated at foreground and the scene in which they are moving are in the background. For example, one could apply the techniques disclosed in U.S. patent application Ser. No. 13/275,263, "Motion Vector Interpolation for Motion Compensation." This presents one possible approach and no limitation to such an approach is intended, nor should it be implied.

The combination of the foreground and background motion vectors may be referred to here as a 'motion pair.' Each block has a motion pair associated with it. If the motion pairs for a block are reliable, then those blocks are clustered by their motion at 12. A representation of the clusters of motion are shown in FIG. 2.

Figure 2:
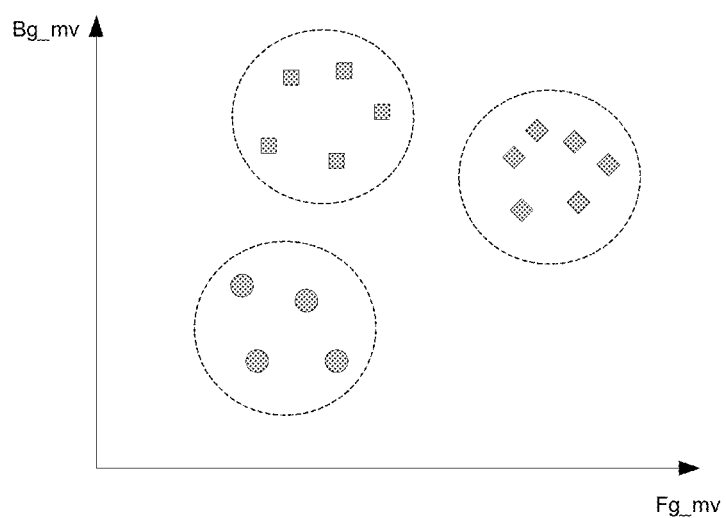
FIG. 2 shows a representation of clusters of motion vectors in a current frame.

In FIG. 2, each cluster has a set of blocks that are identified with that cluster. One should note that the foreground and back ground vectors are shown in two dimensional form for ease of understanding. In reality, both the foreground and background motion vectors are each two dimensional, so the motion pair has four dimensions, which can also be expressed as two references in each of two dimensions. Each circle, square or diamond in FIG. 2 represents local block motion vectors. When they are taken in their totality, they provide information with regard to the overall global motion vector.

Generally, the clustering process involves sub-processes of initialization, clustering and post processing. This is performed for every block that has a motion pair. Unlike other clustering methods used in video, such as K-means clustering, there is no input of a number of clusters. The final cluster number that results from the analysis adapts based upon the video content and the resources available. The process may designate an initial cluster number based upon resources and adapt as needed.

Returning to FIG. 1, once the motion within the frame is clustered, the process uses to predict the motion in interpolated frames for frame interpolation processes in 2D displays. For frame interpolation, the process moves from the frame level clustering at 12 to 14. At 14, the foreground objects are protected, as will be discussed in more detail later. The resulting information is used to interpolate one or more frames between a current frame (CF) and a previous frame (P1).

In addition to the use of the clustered motion pair analysis for frame interpolation, it can be used for 2D to 3D conversion. For 2D to 3D conversion, the object layers are extracted at 18. The resulting objects and motion are then used to perform the conversion at 20.

Figure 3:
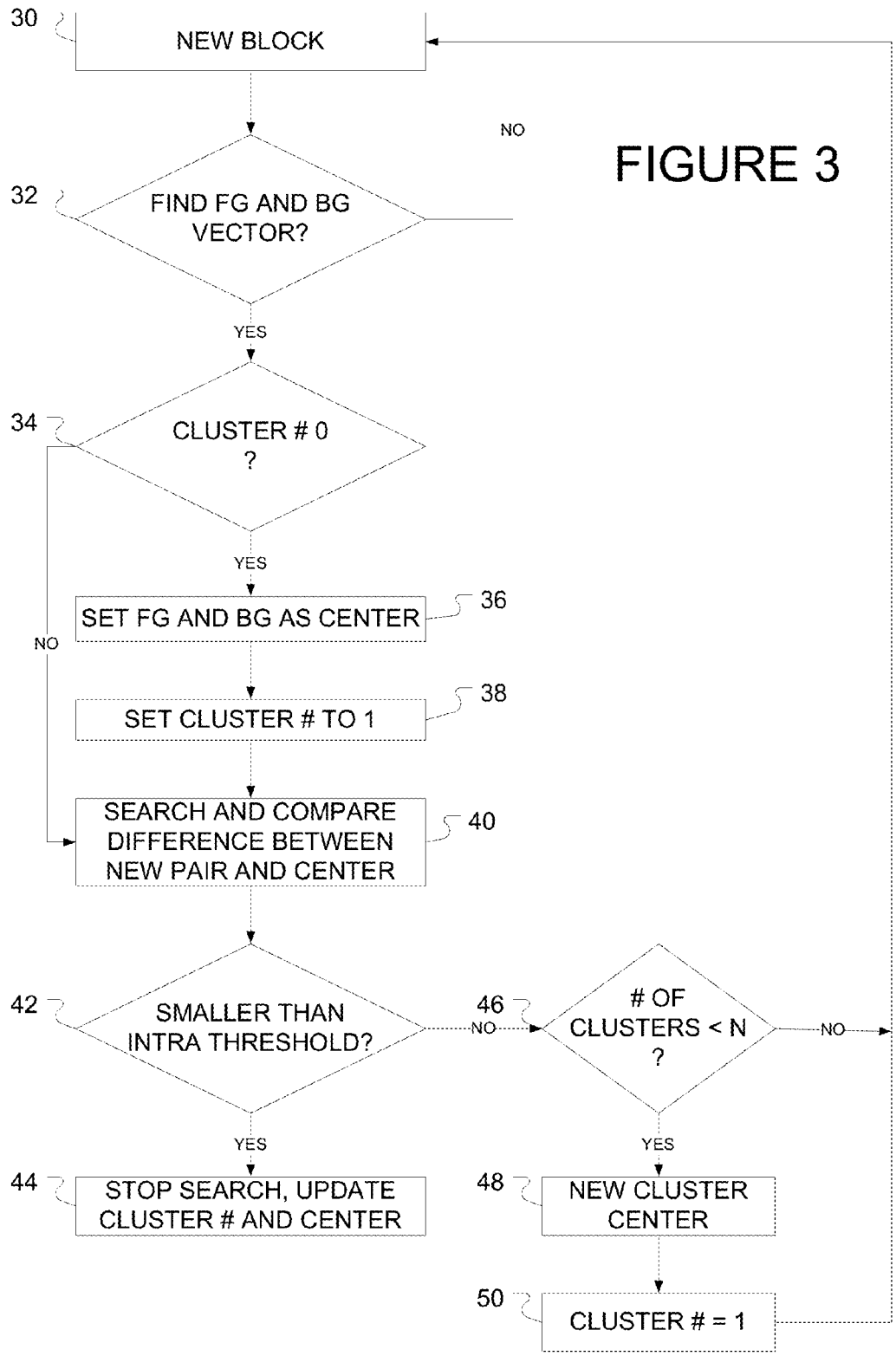
FIG. 3 shows a flowchart of an embodiment of a method of motion estimation using motion layers.

FIG. 3 shows one embodiment of a process to do motion clustering. One should note that this represents merely one possibility and may vary depending upon particular implementations, video content, etc. The process set out in FIG. 3 begins with each block at 30, with the understanding that it may be started at the beginning of each frame or applied to each block, with variations depending upon video content, resources available, etc. As mentioned above, the process generally involves initialization, clustering and post-processing.

During initialization, the maximum number of clusters for a frame may be designated. This will most likely result from resources available, rather than a set number desired. A minimum number of cluster members may also be designated, but this is optional. By default, any cluster that has any members may be utilized. This can be controlled by elimination of clusters that may be collapsed into other clusters, as will be discussed with regard to post-processing. Additionally, the process can identify some thresholds to be used within the process.

A first threshold is the intra cluster distance, which is the maximum distance between a center of any cluster and is farthest member. A second threshold is the inter cluster distance, which is the distance between the clusters themselves. Another initialization would be to set the existing cluster number, N, to zero. The process begins for each block by determining whether or not there is a reliable foreground/ background motion vector pair at 32.

The reliable foreground/background motion vector pair detection depends on whether the process can find a typical motion vector cover/uncover case through motion analysis at that block. The cover/uncover identifies where a moving object covers or uncovers another object or part of the scene as it moves. If no reliable motion pair is found for the current block, the process returns to 30 and the next block. If a reliable motion pair is found, the process checks whether the cluster number is 0. If the number is 0, the process sets motion pair as the cluster center of the first cluster as 36 and sets the cluster number to 1 at 38. If the cluster number is not 0, the process moves to 40.

At 40, the process searches from the center of existing clusters and compares the difference of the center with the new pair. This may be approximated by:

$$Fg\_diff = abs(fg\_mv \cdot x - fg\_c\_N \cdot x) + abs(fg\_mv \cdot y - fg\_c\_N \cdot y)$$

$$Bg\_diff = abs(bg\_mv \cdot x - bg\_c\_N \cdot x) + abs(bg\_mv \cdot y - bg\_c\_N \cdot y);$$

in which the fg_c_N and bg_c_N is from the Nth cluster center (fg_c_N, bg_c_N).

The distance between the new pair the cluster center is:

$$Diff\_c = Fg\_diff + Bg\_diff$$

The process then selects the Mth cluster which has the minimum Diff_c value from all the existing clusters. If the minimum Diff_c value is smaller than the intra cluster distance threshold Thr_intra at 42, the process will update the cluster number and cluster center of cluster M at 44. The update occurs as:

$$fg\_c\_M \cdot x = (fg\_c\_M \cdot x * Num\_M + fg\_mv \cdot x)/(Num\_M+1)$$

$$fg\_c\_M \cdot y = (fg\_c\_M \cdot y * Num\_M + fg\_mv \cdot y)/(Num\_M+1)$$

$$bg\_c\_M \cdot x = (bg\_c\_M \cdot x * Num\_M + bg\_mv \cdot x)/(Num\_M+1)$$

$$bg\_c\_M \cdot y = (bg\_c\_M \cdot y * Num\_M + bg\_mv \cdot y)/(Num\_M+1)$$

$$Num\_M = Num\_M + 1$$

in which Num_M is the number of the members in cluster M.

If the cluster has a motion pair that is not close to any of the existing cluster centers, the process moves to 46 to see if the existing cluster number Num_N is smaller than predefined maximum cluster number N. If it is, then the process sets (fg_mv,bg_mv) as a new cluster center at 48 and sets its cluster member number to 1 at 50 and moves to the next block at 30. If the cluster number is already equals to N, the process moves to the next block at 30. This is merely one example of a process of grouping the motion in the blocks by clusters and using that information to estimate motion.

After clustering of the motion into layers, the process may performs post-processing. The process may eliminate unstable clusters, such as those whose member number is smaller than the predefined minimum number of cluster members set during initialization. The process may also integrate clusters having centers that are very close together into one cluster.

Figure 4:
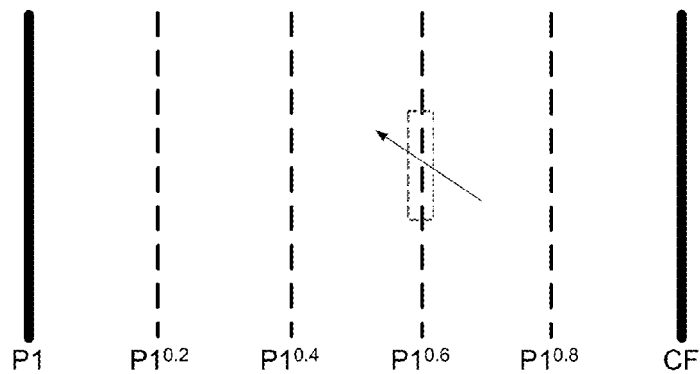
FIG. 4 shows a graphical representation of interpolated frames between a current frame and a previous frame.
Figure 5:
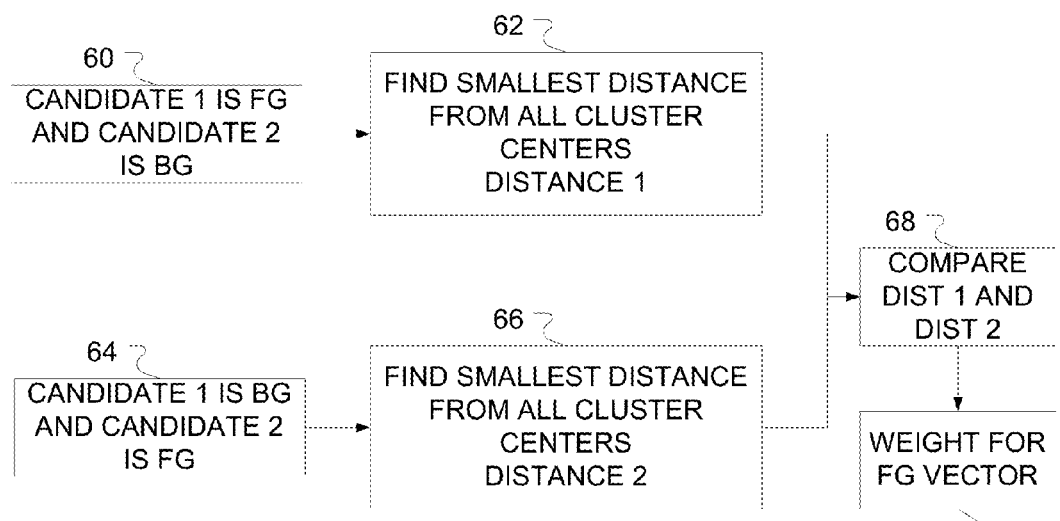
FIG. 5 shows an embodiment of a method to protect foreground objects in a method of motion estimation.
Figure 6:
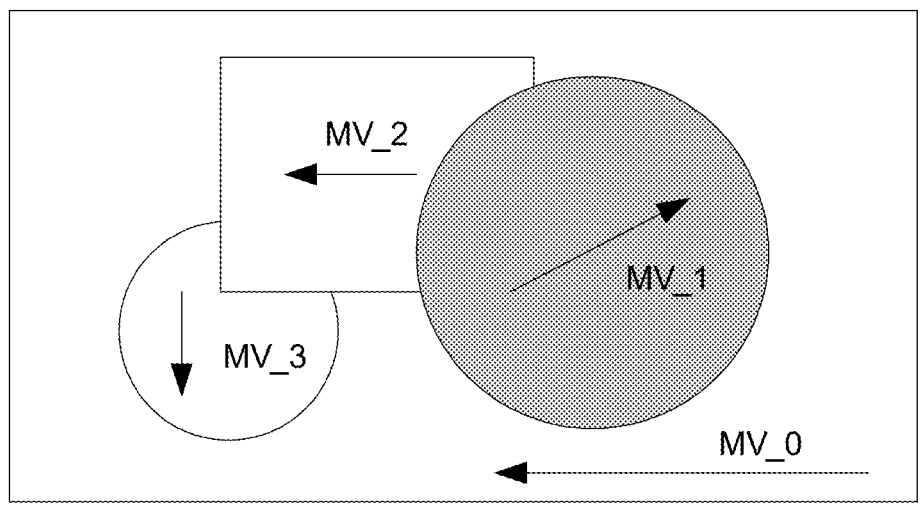
FIG. 6 shows a representation of motion clusters and their associated motion layers.

Another aspect of post-processing may occur with regard to frame interpolation. As shown in FIG. 4, new frames may be interpolated in new phases between a current frame (CF) and the prior frame (P1). As part of the motion estimation process, two candidate motion vectors may be selected for each block. As a simplifying assumption, if the block contains a boundary of an object, then only two motion vectors are required to do accurate frame interpolation: a foreground and background motion vector. Given a pair of motion vectors for a block, it is possible to use the cluster centers to determine which of the two is more likely to be associated by the foreground or the background. Typically, foreground objects being interpolated by the wrong motion vector are more obvious than the halos that result from using the wrong motion vectors for the background in the interpolated frames. The process can manage this by encouraging the foreground motion vectors over the background motion vectors. FIG. 5 shows an example of such a process.

In one variation, the foreground motion vector (FG) is set as a first candidate motion vector and the background motion vector (BG) is set as a second candidate motion vector at 60. At 62, the distance between the candidate pair and the cluster centers is calculated by:

$$D\_N = abs(Cand\_1\_mv \cdot x - fg\_c\_N \cdot x) + abs(Cand\_1\_mv \cdot y - fg\_c\_N \cdot y) + abs(Cand\_2\_mv \cdot x - bg\_c\_N \cdot x) + abs(Cand\_2\_mv \cdot y - bg\_c\_N \cdot y);$$

in which the fg_c_N and bg_c_N is the center of N cluster. From these distances, the minimum distance is selected from all the N distance as D_min_1

In another variation, the foreground motion vector is set as the second candidate and the background motion vector is set as the first candidate 64. The same distance calculation is performed at 66 using the BG as the first candidate and the FG as the second candidate. Finally, the process also gets a minimum distance D_min_2. At 68, the two distances D_min_1 and D_min_2 are compared by finding the difference between them by D_diff=(D_min_1−D_min_2).

A smaller value of D_diff means that the first candidate is more likely the foreground motion vector and the second candidate is more likely the background motion vector. A larger difference value means that the opposite is more likely, that the background motion vector is the first candidate. When the difference value is larger, the process will 'penalize' the first motion vector candidate by multiplying D_diff by a gain value. The gain is used to adjust the value of the penalty. The process can find that if the D_diff value is smaller than 0, the penalty value for the first motion will be also smaller than 0 and this negative value will encourage the first motion vector candidate instead of penalizing it.

The above discussion addresses the results used in the frame interpolation. For 2D-3D conversion, the process can further analyze the global object layer in the whole frame according to these pairs. That is, instead of comparing the cluster centers to individual blocks, the cluster centers are compared to each other. The motion layer extraction from the cluster pair may be best understood with regard to FIG. 5.

The motion layer extraction process generates the motion order of these motions and give each motion layer cluster a distance number. A small distance represents the object is farther from the viewer and a large number represents the object is closer to the viewer. With reference to FIG. 5, the cluster centers are (MV_1, MV_0) (MV_1, MV_2) (MV_2, MV_3) (MV_3, MV_0). The motion list is the unique motion vectors for the clusters. That is, MV_0, MV_1, MV_2, and MV_3. The motion layer extraction process orders all the motions from far to close as MV_0, MV_3, MV_2, MV_1 by giving MV_0 the smallest distance number and MV_1 the largest distance number. The process works by noting that for a given cluster, the fg_mv must have a larger distance number than the bg_mv because that is the definition of foreground versus background.

The motion layer extraction from (fg_mv, bg_mv) pair performs an initialization by giving all the motion vectors in the motion list the initial distance number 0. The distance number of each motion is defined as Dist_mv(0). The (0) means the iteration is 0. The process then searches all the cluster centers for its central motion pair (fg_mv, bg_mv) and update the motion distance number as Dist_fg_mv (n+1)= max(Dist_fg_mv (n), Dist_bg_mv (n)+1). This continues until all of the motion numbers satisfy Dist_mv(n)=Dist_mv (n—1) the process stops the iteration. Otherwise, the process returns to searching and does iteration n+1.

The below table illustrates the changes of the Dist value for each MV in FIG. 5 example. The Dist results of all MV will converge after 4 iterations and the process can get the motion layer from far to close as MV_0, MV_3, MV_2, and MV_1.

|  | MV_0 | MV_1 | MV_2 | MV_3 |
|---|---|---|---|---|
| Iteration 0 | 0 | 0 | 0 | 0 |
| Iteration 1 | 0 | 1 | 1 | 1 |
| Iteration 2 | 0 | 2 | 2 | 1 |
| Iteration 3 | 0 | 3 | 2 | 1 |
| Iteration 4 | 0 | 3 | 2 | 1 |

As a result of the above, the process obtains the Dist_mv for all motions in the motion list which represents the my layer. A smaller Dist_mv means the motion layer is far from the viewer and larger Dist_mv means the motion layer is close to the viewer.

Using the Dist_mv, the process then allocates the disparity to each block as follows. The process arranges the total disparity range for a frame as [disparity_min, disparity_max]. The process then searches all Dist_mv and find the maximum value Dist_mv_max. The process then does block level disparity allocation by getting a block my and search for its nearest neighbors in the motion list. The process then obtains the corresponding Dist_mv for the found nearest neighbor. The disparity is then allocated for the block my by $$\text{Disparity}\_B = \text{disparity\_min} + (\text{disparity\_max} - \text{disparity\_min}) * \text{Dist\_}mv / \text{Dist\_}mv\_\text{max}$$

For post-processing, a filter can be applied on the block level disparity map to smooth the 2D-3D conversion results.

In this manner, a method of handling complex motion for frame interpolation or 2D-3D conversion results in accurate motion estimation. By clustering the motion of the blocks into layers, the accuracy is increased without necessarily increasing the complexity of the hardware or process of performing motion estimation.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of performing motion compensation, comprising:
   dividing a current frame of video data into blocks; and
   clustering the blocks based on motion vectors, wherein clustering the blocks comprises:
      determining a motion pair for a current block, wherein the motion pair consists of a foreground and background motion vector for each block;
      if the current block is other than a first block used, finding a distance from the motion pair from centers of any current clusters; and
      clustering the current block into a cluster based upon the distance.

2. The method of claim 1, further comprising of only using motion vector pairs for each block in which a cover/uncover case is detected.

3. The method of claim 1, further comprising defining the motion pair for the current block as a center of a new cluster, if the current block is the first block in the video frame.

4. The method of claim 1, wherein clustering the current block comprises establishing a new cluster based upon the distance from the motion pair from centers of current clusters.

5. The method of claim 1, wherein clustering the current block comprises clustering the current block with an existing cluster that has a shortest distance between the current motion pair and the center of the existing cluster.

6. The method of claim 1, further comprising using the motion vectors to interpolate at least one new frame of video data between the current frame and a previous frame of video data.

7. The method of claim 1, further comprising post-processing the clusters.

8. The method of claim 7, wherein post-processing the clusters comprising eliminating unstable clusters.

9. The method of claim 7, wherein post-processing the clusters comprising integrating similar clustering.

10. The method of claim 9, wherein integrating similar clustering comprises eliminating clusters that are within a predefined distance of other clusters by grouping the clusters into one cluster.

11. The method of claim 1, further comprising protecting foreground motion layers by biasing a candidate motion vector to increase a likelihood of using a foreground motion vector for a block when interpolating a new frame.

12. The method of claim 1, further comprising:
   identifying centers of clusters of motion vectors; and
   using the centers of the clusters to determine foreground and background motion vectors for the blocks.

13. The method of claim 12, further comprising using the foreground and background motion vectors to interpolate new frames of video data.

14. The method of claim 12, further comprising using the foreground and background motion vectors to rank order the clusters for the frame of video data.

* * * * *